(12) United States Patent
Tanaka et al.

(10) Patent No.: US 7,315,987 B2
(45) Date of Patent: Jan. 1, 2008

(54) IMAGE ADMINISTRATION METHOD, IMAGE ADMINISTRATION APPARATUS AND IMAGE ADMINISTRATION PROGRAM

(75) Inventors: Kazuyoshi Tanaka, Hachioji (JP); Junichi Isamikawa, Hachioji (JP)

(73) Assignee: Konica Corporation (JP)

( * ) Notice: Subject to any disclaimer, the term of this patent is extended or adjusted under 35 U.S.C. 154(b) by 776 days.

(21) Appl. No.: 10/336,428

(22) Filed: Jan. 3, 2003

(65) Prior Publication Data
US 2003/0132969 A1    Jul. 17, 2003

(30) Foreign Application Priority Data
Jan. 15, 2002  (JP) .......................... P2002-006369
Jan. 15, 2002  (JP) .......................... P2002-006372

(51) Int. Cl.
G06F 13/00   (2006.01)
G06F 15/00   (2006.01)

(52) U.S. Cl. ....................... 715/838; 715/837

(58) Field of Classification Search ................ 715/760, 715/763, 838, 744, 765, 837; 709/219, 206
See application file for complete search history.

(56) References Cited

U.S. PATENT DOCUMENTS 6,704,775 B1 *  3/2004  Sato et al. ................... 709/219
6,792,575 B1 *  9/2004  Samaniego et al. ......... 715/513
6,864,904 B1 *  3/2005  Ran et al. .................... 715/760

FOREIGN PATENT DOCUMENTS

| EP | 0 756 414 A2 | 1/1997 |
|---|---|---|
| EP | 0 944 239 A1 | 9/1999 |
| EP | 0 965 929 A2 | 12/1999 |
| JP | 57-757 | 1/1982 |
| JP | 4-33457 | 2/1992 |
| JP | 09-269879 | 10/1997 |
| JP | 2000-175147 | 6/2000 |
| JP | 2000-295557 | 10/2000 |
| JP | 2001-339556 | 12/2001 |

OTHER PUBLICATIONS

European Search Report for Application No. 03250096.9-2201 mailed Jul. 19, 2006.
Clark S.E.: "IrfanView Tutorial, Thumbnails"[Online], Aug. 17, 2001, pp. 1-4.
Office Action for Japanese Patent Application No. 2002-006369 dated Jan. 30, 2007.
Office Action for Japanese Patent Application No. 2002-006369 dated May 15, 2007.

* cited by examiner

*Primary Examiner*—Cao (Kevin) Nguyen
(74) *Attorney, Agent, or Firm*—Cantor Colburn LLP

(57) ABSTRACT

An image administration method, apparatus or program for storing image data and for making contents of the image data to be browsed from outside of an image administration apparatus. The image administration method, apparatus or program comprising the steps or means of: managing image data by a directory employing a user name and a job name; controlling the image administration apparatus so that the image data, identified by the user name, is accessed by inputting the user name; and generating thumbnail image of at least one page of the image data, provided with a file name relating to the job name, so that the thumbnail image is browsed from outside of the image administration apparatus.

15 Claims, 12 Drawing Sheets

JOB LIST

| JOB NAME | STORED DATE | NUMBER OF PAGES |
|---|---|---|
| iijima | 2002/10/03 | 20 |
| kita | 2002/09/25 | 100 |
| samejima | 2001/03/15 | 5 |
| : | : | : |
| :: | : | : |
| tanaka | 2002/04/01 | 15 |

IMAGE

JOB INFORMATION

| STORED DATA | 2002/10/3 |
|---|---|
| NUMBER OF PAGES | 20 |
| DOCUMENT QUALITY | AUTO |
| PRINTING MODE | ONE SIDED PRINTING |
| : | : |
| : | : |
| DOCUMENT KIND | NORMAL |

IMAGE ADMINISTRATION METHOD, IMAGE ADMINISTRATION APPARATUS AND IMAGE ADMINISTRATION PROGRAM

BACKGROUND OF THE INVENTION

The present invention relates to an image administration method, an image administration apparatus and an image administration program, and in particular, to an image administration method, an image administration apparatus and an image administration program, wherein, when a large number of image data are stored in each of plural users, image data can be managed efficiently and the contents of image data can be viewed from outside of the apparatus by thumbnail images for display, while security of each user is taken into consideration.

There have appeared on the market copying machines each being equipped with a hard disk drive and is structured so that image data acquired through reading by a scanner can be stored. In some of them, in this case, image data can be managed by a directory corresponding to a user name, under the consideration that the copying machine will be used by a plurality of users.

In the copying machine as one stated above wherein image data can be stored, there is no consideration for grasping the types of contents of the stored image data, which has made it necessary to confirm the contents by outputting on the recording sheet actually.

Though it is conceivable to generate thumbnail images with reduced image data corresponding to each image data, there has been a problem that contents of the image data are disclosed to others when the thumbnail images are browsed by others, resulting in a decline of security.

Further, with respect to a method to manage image data of each user and thumbnail images to be in connection with each other and a method of browsing, there has been established no decisive method for efficient management of image data.

The invention has been achieved in view of the aforementioned subjects, and its the first aspect is to realize an image administration method, an image administration apparatus and an image administration program wherein, when a plurality of image data are stored in each of plural users, image data can be managed efficiently, while security of each user is taken into consideration.

In the copying machine as one stated above wherein image data can be stored, it is possible to use a web server that is built in the copying machine for grasping, from an outside equipment (user's computer connected with a network), the contents of image data stored in the machine.

However, no consideration has been paid for efficient generation of display-use thumbnail image, although the display-use thumbnail image can be browsed concerning the contents of the stored image data.

Namely, since a hardware is occupied for generation of thumbnail images, operations of copying cannot be conducted simultaneously, and the machine has been required to be in the state of idling, which has caused a decline of copying productivity.

The invention has been achieved in view of the aforementioned subjects, and its second aspect is to realize an image administration method, an image administration apparatus and an image administration program wherein, a plurality of image data are stored, and when contents of stored image data are browsed by an external equipment as thumbnail images, display-use thumbnail image is generated and stored efficiently as image data are stored.

SUMMARY OF THE INVENTION

Namely, the invention representing a means to solve the subjects stated above is as follows.

Structure (1)

The invention is an image administration method that stores image data and makes contents of image data to be browsed from the outside, wherein image data are managed by a directory employing a user name and a job name, each job of the corresponding user is controlled to be capable of being accessed, by inputting a user name, and thumbnail images on at least one page of image data of each job are generated with a file name relating to the job name so that the thumbnail images may be browsed from the outside.

In the present invention, image data are stored, and the image data are managed by a directory using a user name and a job name when contents of the image data are browsed from the outside, each job of the corresponding user is controlled to be capable of being accessed, by inputting the user name, and thumbnail images on at least one page of image data of each job are generated under the file name relating to the job name so that the thumbnail images may be browsed from the outside.

Hereby, if a user name is not inputted, neither access to each image data nor reading of thumbnail images is possible, resulting in no occurrence of the problem that contents of the image data are disclosed to others and security is lowered. Further, it is possible to manage image data of each user and thumbnail images to be in connection with each other and to conduct efficient management of image data.

Namely, image data can be managed and can be browsed efficiently while security of each user is taken into consideration, even when a plurality of image data are being stored in each of plural users.

Structure (2)

The invention is an image administration apparatus having therein an image data storage means that stores image data, an image data management means that manages image data by a directory employing a user name and a job name and controls so that each job of the corresponding user may be accessed by inputting a user name, a thumbnail images generating means that generates thumbnail images on at least one page of image data of each job under the file name relating to the job name, and stores them in the image data storage means, and a control means that controls the thumbnail images generated under the file name related to each job to be capable of being browsed in accordance with an input of a user name from the outside, concerning image data stored in the image data storage means.

In the invention, image data are stored, then, the image data are managed by a directory employing a user name and a job name when contents of the image data are browsed from the outside, and control is made by inputting a user name so that each job of the corresponding user may be accessed, and by generating thumbnail images on at least one page of image data of each job under the file name relating to the job name, thus, the thumbnail images are controlled to be capable of being browsed from the outside.

Hereby, if a user name is not inputted, neither access to each image data nor browsing of thumbnail images is possible, resulting in no occurrence of the problem that contents of the image data are disclosed to others and security is lowered. Further, it is possible to manage image data of each user and thumbnail images to be in connection with each other and to conduct efficient management of image data.

Namely, image data can be managed and can be read efficiently while security of each user is taken into consideration, even when a plurality of image data are being stored in each of plural users.

Structure (3)

The invention is an image administration program used for an apparatus having therein an image data storage means that stores image data, an image data management means that manages image data by a directory employing a user name and a job name and controls so that each job of the corresponding user may be accessed by inputting a user name, a thumbnail images generating means that generates thumbnail images on at least one page of image data of each job under the file name relating to the job name, and stores them in the image data storage means, and a control means that conducts various controls, wherein, regarding image data stored in the image data storage means, thumbnail images generated under the file name relating to each job stated above are controlled to be capable of being browsed in accordance with input of the user name from the outside.

In the present invention, image data are stored, then, the image data are managed by a directory employing a user name and a job name when contents of the image data are browsed from the outside, and control is made by inputting a user name so that each job of the corresponding user may be accessed, and by generating thumbnail images on at least one page of image data of each job under the file name relating to the job name, thus, the thumbnail images are controlled to be capable of being browsed from the outside.

Hereby, if a user name is not inputted, neither access to each image data nor browsing of thumbnail images is possible, resulting in no occurrence of the problem that contents of the image data are disclosed to others and security is lowered. Further, it is possible to manage image data of each user and thumbnail images to be in connection with each other and to conduct efficient management of image data.

Namely, image data can be managed and can be read efficiently while security of each user is taken into consideration, even when a plurality of image data are being stored in each of plural users.

Structure (4)

The invention is the image administration method wherein, image data of each user and thumbnail images are managed to be in connection with each other, and when one of the aforementioned two items is deleted, the other item is also deleted in an interlocking manner.

In the present invention, image data of each user and thumbnail images are managed to be in connection with each other, and therefore, when either one of the aforementioned two items is deleted, the other item can also be deleted in an interlocking manner, thus, it is possible to manage image data efficiently while keeping consistency Structure (5)

The invention is the image administration apparatus wherein, image data of each user and thumbnail images are managed to be in connection with each other, and when either one is deleted, the other is interlocked therewith and deleted as well.

In the present invention, image data of each user and thumbnail images are managed to be in connection with each other, and therefore, when either one is deleted, the other can also be deleted in an interlocking manner, thus, it is possible to manage image data efficiently while keeping consistency.

Structure (6)

The invention is the image administration program wherein, image data of each user and thumbnail images are managed to be in connection with each other, and when either one is deleted, the other is interlocked therewith and deleted as well.

In the present invention, image data of each user and thumbnail images are managed to be in connection with each other, and therefore, when either one is deleted, the other can also be deleted in an interlocking manner, thus, it is possible to manage image-data efficiently while keeping consistency.

Structure (7)

The invention is the image administration method wherein, image data of each user and thumbnail images are managed to be in connection with each other, and when displaying thumbnail images, information of the job to which the original image data belong is acquired and that information is displayed.

In the present invention, image data of each user and thumbnail images are managed to be in connection with each other, and therefore, when displaying thumbnail images, it is possible to acquire information of the job to which the original image data belong and to display the number of sheets of images together, which makes it possible to manage image data efficiently.

Structure (8)

The invention is the image administration apparatus wherein, image data of each user and thumbnail images are managed to be in connection with each other, and when displaying thumbnail images, information of the job to which the original image data belong is acquired and that information is displayed.

In the present invention, image data of each user and thumbnail images are managed to be in connection with each other, and therefore, when displaying thumbnail images, it is possible to acquire information of the job to which the original image data belong and to display the number of sheets of images together, which makes it possible to manage image data efficiently.

Structure (9)

The invention is the image administration program wherein, image data of each user and thumbnail images are managed to be in connection with each other, and when displaying thumbnail images, information of the job to which the original image data belong is acquired and that information is displayed.

In the present invention, image data of each user and thumbnail images are managed to be in connection with each other, and therefore, when displaying thumbnail images, it is possible to acquire information of the job to which the original image data belong and to display the number of sheets of images together, which makes it possible to manage image data efficiently.

Structure (10)

The invention is the image administration method wherein, information to be displayed is either one of the number of sheets of images, a date, and a condition of output, or a combination thereof.

In the present invention, image data of each user and thumbnail images are managed to be in connection with each other, and therefore, when displaying thumbnail images, it is possible to acquire information of the job to which the original image data belong and to display either one of the number of sheets of images, a date and a condition of output, or a combination thereof together, which makes it possible to manage image data efficiently.

Structure (11)

The invention is the image administration apparatus wherein, information to be displayed is either one of the number of sheets of images, a date, and a condition of output, or a combination thereof.

In the present invention, image data of each user and thumbnail images are managed to be in connection with each other, and therefore, when displaying thumbnail images, it is possible to acquire information of the job to which the original image data belong and to display either one of the number of sheets of images, a date and a condition of output, or a combination thereof together, which makes it possible to manage image data efficiently.

Structure (12)

The invention is the image administration program wherein, information to be displayed is either one of the number of sheets of images, a date, and a condition of output, or a combination thereof.

In the present invention, image data of each user and thumbnail images are managed to be in connection with each other, and therefore, when displaying thumbnail images, it is possible to acquire information of the job to which the original image data belong and to display either one of the number of sheets of images, a date and a condition of output, or a combination thereof together, which makes it possible to manage image data efficiently.

Structure (13)

The invention is an image administration method that stores output-use image data and makes contents of output-use image data to be browsed from the outside as display-use thumbnail image, wherein display-use thumbnail image is generated from the output-use image data simultaneously with the work of storing the output-use image data in a storage means, to be stored in the storage means.

In the present invention, when storing output-use image data and making contents of the output-use image data to be browsed from the outside as display-use thumbnail image, display-use thumbnail image is generated from the output-use image data simultaneously with the work of storing the output-use image data in a storage means, to be stored in the storage means.

When a plurality of image data are stored and contents of the stored image data are browsed by the external equipment as display-use thumbnail image, it is possible to generate and store display-use thumbnail image efficiently as image data are stored.

Structure (14)

The invention is an image administration method that stores output-use image data and makes contents of output-use image data to be browsed from the outside as display-use thumbnail image, wherein, after completion of the work for storing output-use image data in a storage means, the output-use image data are read from the storage means, and display-use thumbnail image is generated from the output-use image data, to be stored in the storage means.

In the present invention, when storing output-use image data and making contents of the output-use image data to be browsed from the outside as display-use thumbnail image, after completion of work for storing the output-use image data in the storing means, the output-use image data are read from the storage means on a memory area and display-use thumbnail image is generated from the output-use image data, to be stored in the storage means.

Owing to this processing in time sequence, material resources such as CPU and a memory can be utilized effectively, it is possible to generate and store display-use thumbnail image effectively as image data are stored, when a plurality of image data are stored, and contents of the stored image data are browsed by an external equipment as display-use thumbnail image.

Structure (15)

The invention is an image administration method that stores output-use image data and makes contents of output-use image data to be browsed from the outside as display-use thumbnail image, wherein display-use thumbnail image is generated from the output-use image data, to be stored in the storage means, simultaneously with the work for storing output-use image data in the storage means, and when the display-use thumbnail image fail to be generated, the output-use image data are read from the storage means automatically or based on user instruction, display-use thumbnail image is generated from the output-use image data and stored in the storage means after completion of the work for storing output-use image data in the storage means.

In the present invention, when storing output-use image data and making contents of output-use image data to be browsed from the outside as display-use thumbnail image, display-use thumbnail image is generated from the output-use image data, to be stored in the storage means, simultaneously with the work for storing output-use image data in the storage means, and when the display-use thumbnail image fail to be generated, the output-use image data are read from the storage means on a memory area in the inside, and display-use thumbnail image is generated from the output-use image data, to be stored in the storage means, after completion of the work for storing the output-use image data in the storing means.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

Structure (16)

The invention is the image administration method wherein, after completion of the work to accept instructions for generating display-use thumbnail image of output-use image data, and to store the output-use image data in the storage means, a specific page of the aforementioned output-use image data is read from the storage means, and display-use thumbnail image is generated from the output-use image data to be stored in the storage means.

In the present invention, in the Structure (14) or (15) stated above, after completion of the work to accept instructions for generating display-use thumbnail image of output-use image data, and to store the output-use image data in the storage means, a specific page of the aforementioned output-use image data is read on an inner memory area from the storage means, and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

Structure (17)

The invention is the image administration method wherein, an instruction, for specifying the page for generating the display-use thumbnail image, is accepted when the output-use image data are composed of plural pages; after completion of the work to store the output-use image data in the storage means, a specific page of the aforementioned output-use image data is read from the storage means, and display-use thumbnail image is generated from the output-use image data to be stored in the storage means.

In the present invention, in the Structure (14) or (15) stated above wherein, after completion of the work to accept instructions for the page for generation of display-use thumbnail image and to store the output-use image data in the storage means, the specified page of the aforementioned output-use image data is read from the storage means, and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

Structure (18)

The invention is an image administration apparatus wherein there are provided a storage means to store output-use image data and display-use thumbnail image, and a control means that generates display-use thumbnail image from the output-use image data simultaneously with the work to store the output-use image data in the storage means and stores them in the storage means.

In the present invention, when storing output-use image data and making contents of the output-use image data to be browsed from the outside as display-use thumbnail image, display-use thumbnail image is generated from the output-use image data to be stored in the storage means, simultaneously with the work to store output-use image data in the storage means.

Owing to this simultaneous processing, when storing a plurality of image data and making the contents of the stored image data to be browsed by an external equipment as display-use thumbnail image, it is possible to generate display-use thumbnail image efficiently as image data are stored and to store it.

Structure (19)

The invention is an image administration apparatus wherein there are provided a storage means to store output-use image data and display-use thumbnail image, and a control means that reads the output-use image data out of the storage means and thereby generates display-use thumbnail image from the output-use image data to store it in the storage means, after completion of the work to store the output-use image data in the storage means.

In the present invention, when storing output-use image data and making contents of the output-use image data to be browsed from the outside as display-use thumbnail image, after completion of work for storing the output-use image data in the storing means, the output-use image data are read from the storage means on a memory area and display-use thumbnail image is generated from the output-use image data, to be stored in the storage means.

Owing to this processing in time sequence, material resources such as CPU and a memory can be utilized effectively, it is possible to generate and store display-use thumbnail image effectively as image data are stored, when a plurality of image data are stored, and contents of the stored image data are browsed by an external equipment as display-use thumbnail image.

Structure (20)

The invention is an image administration apparatus wherein there are provided a storage means to store output-use image data and display-use thumbnail image, and a control means that generates display-use thumbnail image from the output-use image data to store it in the storage means simultaneously with the work to store the output-use image data in the storage means, and reads the output-use image data out of the storage means and thereby generates display-use thumbnail image from the output-use image data to store it in the storage means, after completion of the work to store the output-use image data in the storage means, when failing in generation of the display-use thumbnail image.

In the present invention, when storing output-use image data and making contents of the output-use image data to be browsed from the outside as display-use thumbnail image, display-use thumbnail image is generated from the output-use image data to be stored in the storage means, simultaneously with the work to store output-use image data in the storage means, and the output-use image data are read out of the storage means on an inner memory area and display-use thumbnail image is generated from the output-use image data to be stored in the storage means, after completion of the work to store the output-use image data in the storage means, when the display-use thumbnail image fail to be generated.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

Structure (21)

The invention is the image administration apparatus wherein, an operation input means to accept instructions for generating display-use thumbnail image of output-use image data is provided, and the control means reads a specific page of the output-use image data from the storage means, and generates display-use thumbnail image from the output-use image data to store it in the storage means, after completion of the work to store the output-use image data in the storage means.

In the present invention, in the Structure (19) or (20) stated above, instructions for generating display-use thumbnail image is accepted, and after completion of the work to store output-use image data in the storage means, a specific page of the output-use image data is read from the storage means on an inner memory area and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

Structure (22)

The invention is the image administration apparatus wherein, an operation input means to accept instructions for generating display-use thumbnail image when output-use image data are composed of plural pages is provided, and the control means reads a specific page of the output-use image data from the storage means, and generates display-use thumbnail image from the output-use image data to store it in the storage means, after completion of the work to store the output-use image data in the storage means.

In the present invention, in the Structure (19) or (20) stated above, instructions for generating display-use thumbnail image is accepted, and after completion of the work to store output-use image data in the storage means, a specific page of the output-use image data is read from the storage means on an inner memory area and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

Structure (23)

The invention is an image administration program to be used in an image administration apparatus in which output-use image data are stored and contents of the output-use image data can be browsed from the outside as display-use thumbnail image, wherein display-use thumbnail image is generated from the output-use image data and are stored in the storage means, simultaneously with the work to store output-use image data in a storage means.

In the present invention, when contents of the output-use image data are browsed from the outside as display-use thumbnail image together with storage of output-use image data, display-use thumbnail image is generated from the output-use image data and stored in the storage means simultaneously with the work for storing output-use image data in the storage means.

Owing to the aforementioned simultaneous processing, a plurality of image data are stored and display-use thumbnail image can be generated and stored efficiently, as image data are stored, when contents of the stored image data are browsed by an external equipment as display-use thumbnail image.

Structure (24)

The invention is an image administration program to be used in an image administration apparatus in which output-use image data are stored and contents of the output-use image data can be browsed from the outside as display-use thumbnail image, wherein the output-use image data are read out of the storage means after completion of the work to store output-use image data in the storage means, and display-use thumbnail image is generated from the output-use image data and stored in the storage means.

In the present invention, when contents of the output-use image data are browsed from the outside as display-use thumbnail image together with storage of output-use image data, display-use thumbnail image is generated from the output-use image data and stored in the storage means, by reading out the output-use image data on a memory area from the storage means, after completion of simultaneously with the work for storing output-use image data in the storage means.

Owing to the aforementioned processing in time sequence, material resources such as CPU and a memory can be utilized effectively, and when storing a plurality of image data and when making contents of the stored image data to be browsed by an external equipment as display-use thumbnail image, display-use thumbnail image can be generated and stored efficiently as image data are stored.

Structure (25)

The invention is an image administration program to be used in an image administration apparatus in which output-use image data are stored and contents of the output-use image data can be browsed from the outside as display-use thumbnail image, wherein display-use thumbnail image is generated from the output-use image data and stored in the storage means simultaneously with the work to store output-use image data in the storage means, and when the display-use thumbnail image fail to be generated, the output-use image data are read out of the storage means, and display-use thumbnail image is generated from the output-use image data and stored in the storage means after completion of the work to store output-use image data in the storage means.

In the present invention, when contents of the output-use image data are browsed from the outside as display-use thumbnail image together with storage of output-use image data, display-use thumbnail image is generated from the output-use image data and stored in the storage means simultaneously with the work to store output-use image data in the storage means, and when the display-use thumbnail image fail to be generated, the output-use image data are read out of the storage means on an inner memory area, and display-use thumbnail image is generated from the output-use image data and stored in the storage means after completion of the work to store output-use image data in the storage means.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

Structure (26)

The invention is the image administration program, wherein instructions for generating display-use thumbnail image of output-use image data are accepted, and a specific page of the output-use image data is read and display-use thumbnail image is generated from the output-use image data and are stored in the storage means, after completion of the work to store output-use image data in the storage means.

In the present invention, in the Structure (24) or (25) stated above, instructions for generating display-use thumbnail image is accepted, and after completion of the work to store output-use image data in the storage means, a specific page of the output-use image data is read from the storage means on an inner memory area and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

Structure (27)

The invention is the image administration program, wherein instructions for a page to generate display-use thumbnail image is accepted, and a specified page of the output-use image data is read out of the storage means on an inner memory area, and display-use thumbnail image is generated from the output-use image data and are stored in the storage means, after completion of the work to store output-use image data in the storage means.

In the present invention, in the Structure (24) or (25) stated above, instructions for the page for generating display-use thumbnail image is accepted, and after completion of the work to store output-use image data in the storage means, the specified page of the output-use image data is read from the storage means on an inner memory area and display-use thumbnail image is generated from the output-use image data to be stored in the storage means.

Owing to the processing stated above, it is possible to generate and store optional display-use thumbnail image, when contents of the stored image data are browsed by an external equipment as display-use thumbnail image.

BRIEF DESCRIPTION OF THE DRAWINGS

FIGS. 8(a) through 8(b2) are illustrations showing illustratively operations in the embodiment of the invention.

DETAILED DESCRIPTION OF THE INVENTION

Figure 1:
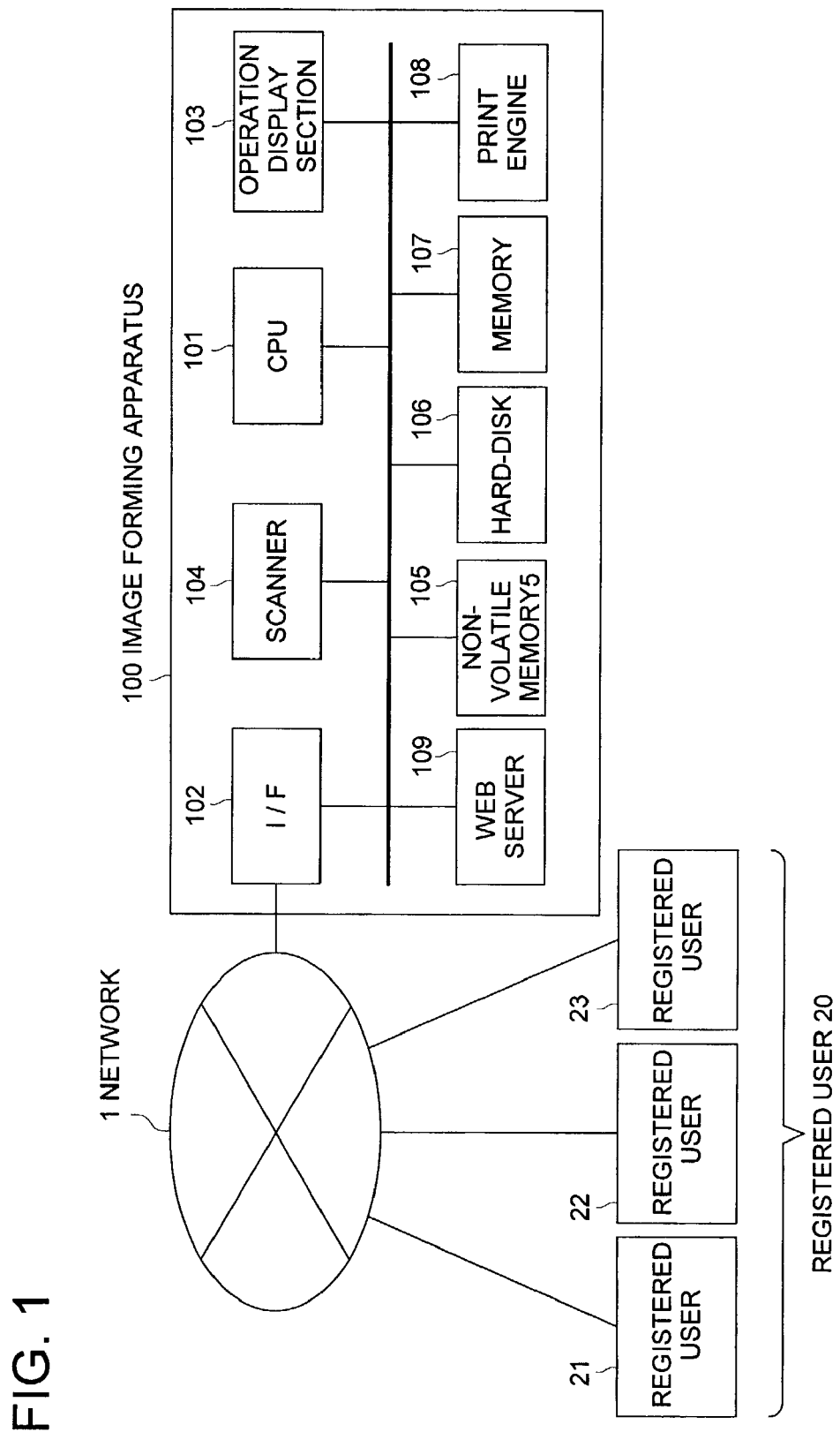
FIG. 1 is a function block diagram showing the electric structure of an image forming apparatus in an embodiment of the invention.

Embodiments of the invention will be explained in detail as follows, referring to the drawings. Incidentally, in the following embodiment, a concrete example of an image forming apparatus will be explained as an image administration apparatus. In the same way, operations of the image forming apparatus will be explained as an image administration method. Further, as an image administration program, an explanation will be given by the program used in the image forming apparatus.

FIRST EMBODIMENT

FIG. 1 is a block diagram showing the structure of the First Embodiment. In this diagram, numeral 1 represents the network to which at least registered user 20 explained later and image forming apparatus 100 are connected to conduct data communication. Incidentally, the network 1 includes various networks such as LAN, WAN, an intranet and the Internet.

Numeral 20 represents a registered user who is registered as a manager or a user of image forming apparatus 100 through network 1. Incidentally, "registered user" mentioned in this case means actually a "computer used by the registered user". Sometimes, a plurality of the registered users are present, and registered user 21, registered user 22 and registered user 23 are shown as a concrete example. Incidentally, the registered user 20 functions as an external equipment because it is present outside the image forming apparatus 100.

Numeral 100 represents an image forming apparatus that has a function to output (print output) through image forming concerning image data obtained by the computer through the network 1 or image data obtained through reading by a built-in scanner, manages image data by means of a directory using a user name and a job name, controls to be capable of accessing each job of the corresponding user by inputting the user name, and generates thumbnail images on the first page of image data of each job under the file name relating to the job name so that the thumbnail images may be browsed from the outside. This function is owned by CPU 101 representing a control means.

In the image forming apparatus 100, numeral 101 represents CPU serving as a control means that controls respective portions, 102 represents an interface (I/F) serving as a communication means that conducts communication through the network 1 or a cable, 103 represents an operation display section where various operations of the apparatus are inputted and various displays are conducted, 104 represents a scanner that generates image data by reading document images, 105 represents a non-volatile memory serving as a table where various data and established values of the image forming apparatus 100 are stored, 106 represents a hard disk drive in which various types of data including image data are housed, 107 represents a memory composed of a semiconductor memory for conducting development of image data execution of program in the case of image forming, 108 represents a print engine that forms and outputs images on a recording sheet, and 109 represents a web server that offers browsing service for browsing the state of the image forming apparatus 100 and stored image data as a web page.

Further, this web server 109 makes it possible to conduct management of image data such as printing output and deleting for image data stored in the image forming apparatus from a computer on the network 1.

Incidentally, the CPU 101 has functions of various means including an image data storage means that stores image data, an image data management means that manages image data with a directory using a user name and a job name, and controls to be able to access each job of the corresponding user by inputting a user name, a thumbnail image generating means that generates thumbnail images on the first page of image data of each job under the file name relating to the job name, and stores them in the image data storage means, and a control means that controls so that thumbnail images generated under the file name relating to aforesaid each job with respect to image data stored in the image data storage means may be browsed in accordance with inputting of a user name from the outside.

Further, in the present embodiment, it is assumed that various types of initial data necessary for operations of the web server 109 and respective portions of other apparatus and image data obtained through reading by scanner 104 are stored in hard disk drive 106.

Further, a copying machine, a facsimile unit and a printer correspond to image forming apparatus 100 that is connected to the network 1. In addition, print engine 108 may be one employing an LED print head and one of an ink jet type in addition to one of an electrophotographic type using a laser beam.

Operations of the characteristic portion of the present embodiment in the image forming apparatus as that stated above will be explained as follows, referring to the illustration in FIG. 2, with respect to the portion of the managing method for image data.

In image forming apparatus 100 in the present embodiment, image data are managed by a directory using a user name and a job name.

Figure 2:
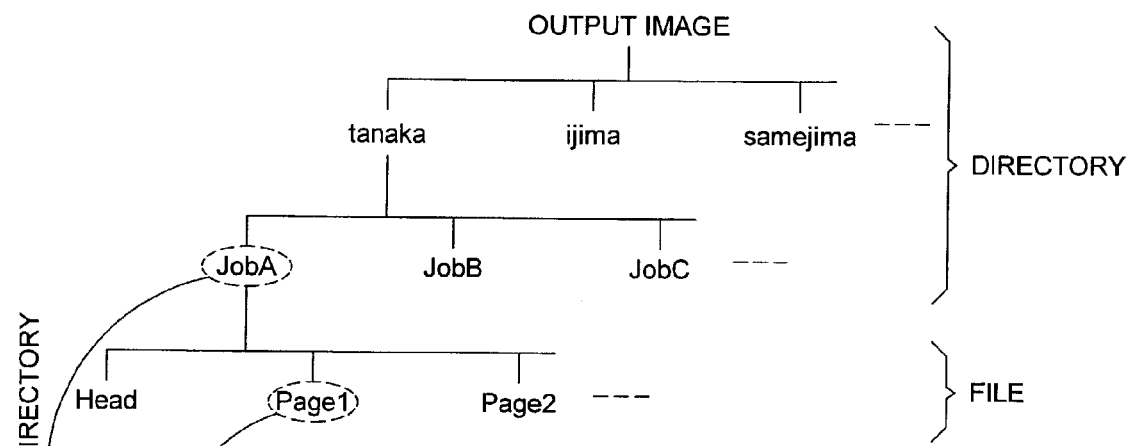
FIGS. 2(a) and 2(b) are illustrations showing the structure of a directory in an embodiment of the invention.
Figure 2:
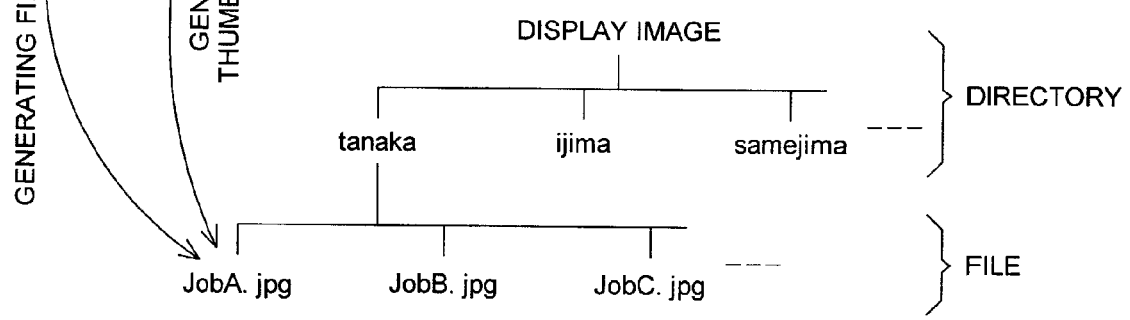

An illustration of the structure of the directory in FIG. 2(*a*) shows a directory that manages output images (namely, image data to be subjected to print output). With respect to image data obtained through reading by scanner 104 and stored in hard disk drive 106, in this case, user names such as, for example, "tanaka", "ijima" and "samejima" are used. With respect to the user name "tanaka", job names for different jobs such as "JobA", "JobB" and "JobC" are present, and they are used as a subdirectory name that is subordinate to tanaka.

In the subdirectory "JobA" of "tanaka", there are stored header information "Head", Page 1 as image data on the first page and Page 2 as image data on the second page. Incidentally, "Head" means header information of each job, and information of the total number of pages and date information for image data included in each job are stored. In this way, image data for each job of each user are managed and stored.

A diagram for illustrating the structure of a directory shown in FIG. 2(*b*) shows a directory that manages display images (namely, image data to be displayed as thumbnail images). The display images in this case mean thumbnail images which are provided for judging easily, from an external equipment, the contents of output-use image data obtained through reading by scanner 104 and stored, and they are generated and stored simultaneously with storage of output-use image data in hard disk drive 106. Incidentally, the thumbnail images may be generated simultaneously with or after the storage of the output-use image data by conducting thinning-out in the known method.

Therefore, the user name is used as a directory name to match the aforementioned output-use image data, and "tanaka", "ijima" and "samejima", for example, are used as a user name.

Since different jobs represented by "JobA", "JobB" and "JobC" are present with respect to the user name "tanaka", a name of thumbnail images is determined by a directory name of each job. For example, a name of thumbnail images corresponding to JobA is made to be JobA.jpg. In addition, thumbnail images are generated based on image data on the first page of image data for JobA. Namely, thumbnail images on the first page of image data of each job are generated under the file name relating to the job name. In the case of FIG. 2(*b*), thumbnail images of JobA.jpg, JobB.jpg and JobC.jpg are generated for the user "tanaka" and stored in hard disk drive 106.

Incidentally, though output-use image data and display-use thumbnail image are stored respectively in different directories in this case, it is possible either to store them in the same directory or to store them in different disk drives.

Operations of the characteristic portion of the present embodiment in the image forming apparatus as that stated above will be explained as follows, referring to FIG. 3.

Figure 3:
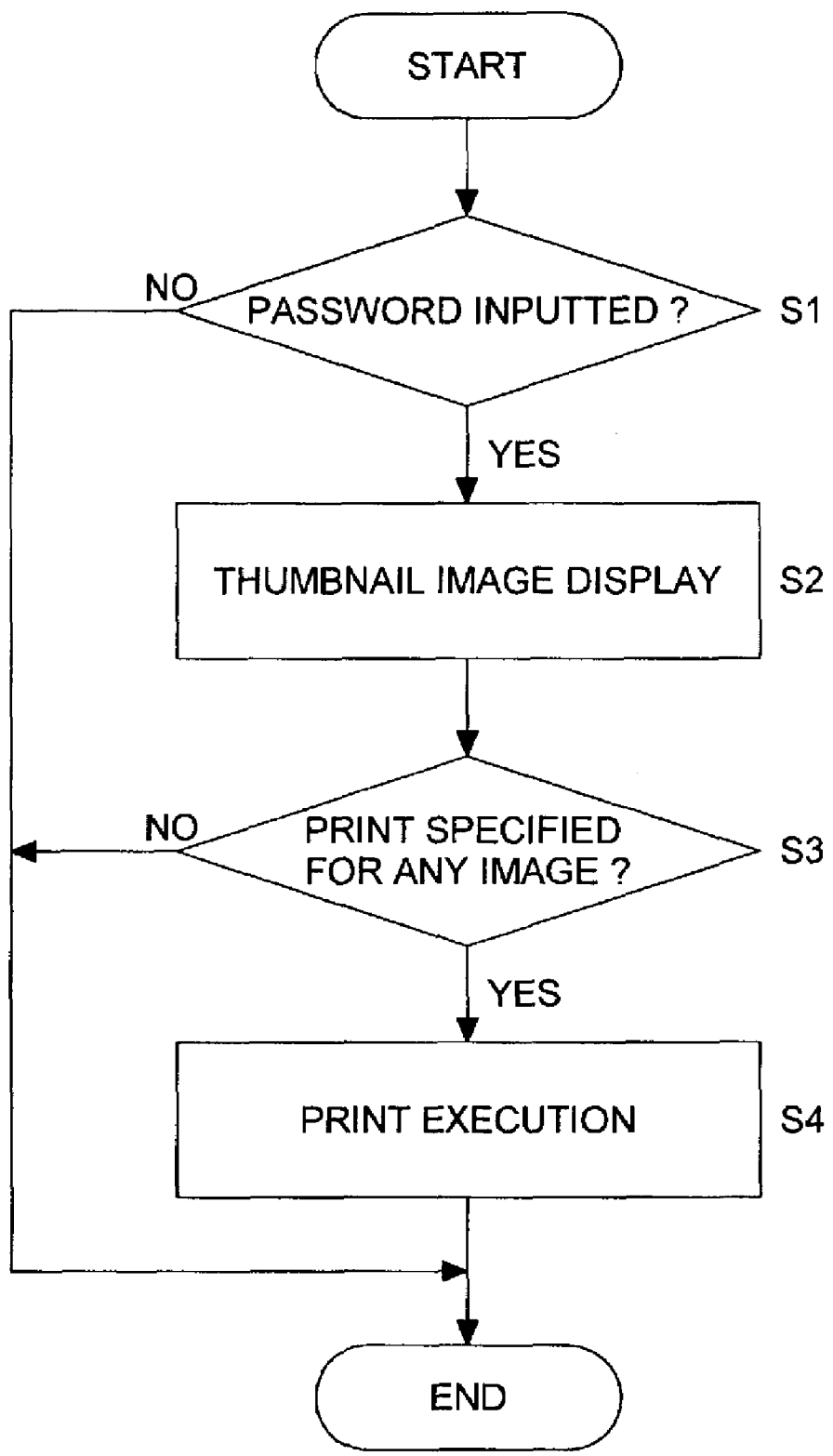
FIG. 3 is a flow chart showing operations of an image forming apparatus in the embodiment example representing an image forming apparatus of the invention.

Incidentally, the flow chart in FIG. 3 shows how CPU 101 representing a control means operates based on the program stored in non-volatile memory 105, in the case of execution of image administration relating to print output of image forming apparatus 100.

Incidentally, in the explanation of operations in the following embodiment, controls and operations conducted by CPU 101 and by the program stored in non-volatile memory 105 are simply mentioned as control of CPU 101.

After a power supply for image forming apparatus 100 is turned on, a control program stored in non-volatile memory 105 is developed by IPL on memory 107, and the control program on the memory 107 makes CPU 101 to control image administration.

Figure 4:
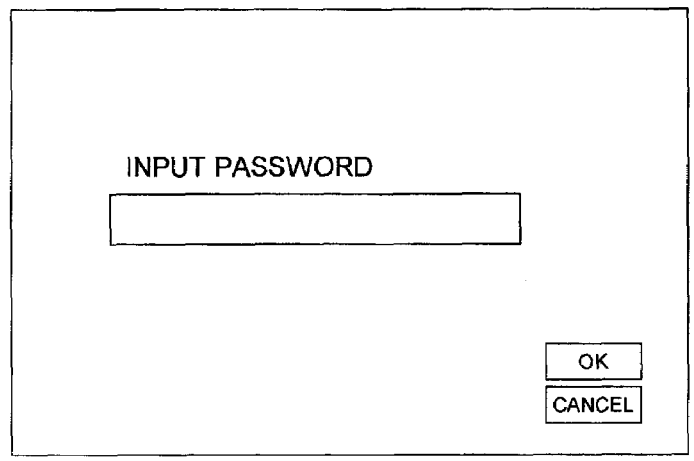
FIGS. 4(a) through 4(c) are illustrations of a display screen in an embodiment example of the invention.
Figure 4:
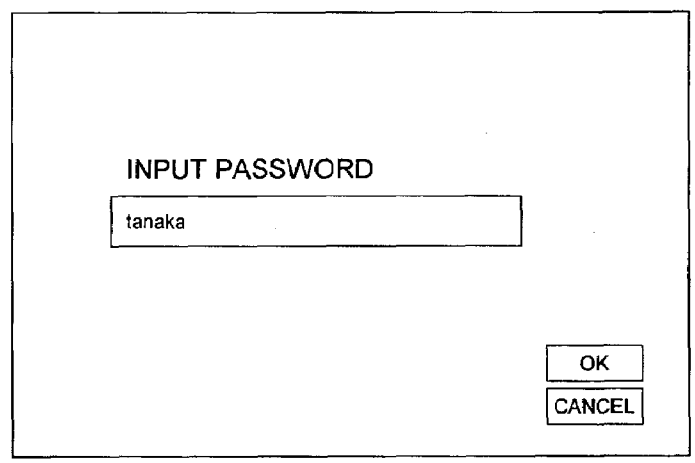
Figure 4:
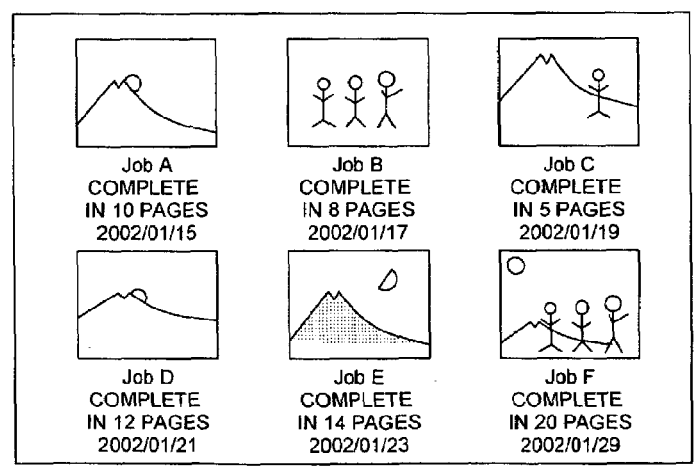

First, CPU 101 follows the control program to display a screen (FIG. 4(*a*)) that accepts input of a password on the computer of registered user 20 (either one of 21-23) who requests the connection to image forming apparatus 100 (FIG. 3 S1).

In the present embodiment, a concrete example is an occasion where a user name is inputted as a password. An example shown in FIG. 4(*b*) indicates that user "tanaka" has inputted a user name "tanaka".

If registered user 20 inputs an appropriate password (YES at S1 in FIG. 3), CPU 101 displays thumbnail images (JobA.jpg, JobB.jpg, JobC.jpg . . . , in this case) stored in a directory (display image/tanaka/ in this case) of the corresponding registered user as shown in FIG. 4(*c*) for the computer of the registered user 20 (FIG. 3 S2).

In the present embodiment, the appropriate password in this case means a directory name (tanaka, ijima, samejima etc.) determined based on the user name. However, the appropriate password can also be determined in another way.

In the case of the present embodiment, thumbnail images on the first page of image data for each job are generated under the file name relating to that job name, and control is made so that each job of a user can be accessed by inputting a name of the user and thereby the thumbnail images may be browsed from the outside. Hereby, thumbnail images cannot be browsed unless a password (user name representing a directory name, in this case) is known, which does not cause a problem that contents of image data are disclosed to others and security is lowered. It is further possible to manage image data of each user and thumbnail images to be in connection with each other, and thereby to manage image data efficiently. Namely, even when a plurality of image data are stored in each of plural users, efficient management and browsing of image data are made possible while security of each user is taken into consideration.

Since output-use image data of each user (FIG. 2(*a*)) and thumbnail images (FIG. 2(*b*)) are managed to be in connection with each other in the display of thumbnail images, it is possible to display also print conditions such as the number of sheets of images, date information, a distinction between a single side and both sides, existence of stapling and the number of sets, by acquiring, from header information "Head", information of a job to which original image data belong, in the case of display of thumbnail images. In the example shown in FIG. 4(*c*), there is indicated an occasion where a job name, the number of sheets and date information are displayed below the thumbnail images. Incidentally, a job name can be acquired from a file name of thumbnail images because the job name is the same as the file name of thumbnail images.

Figure 5A:
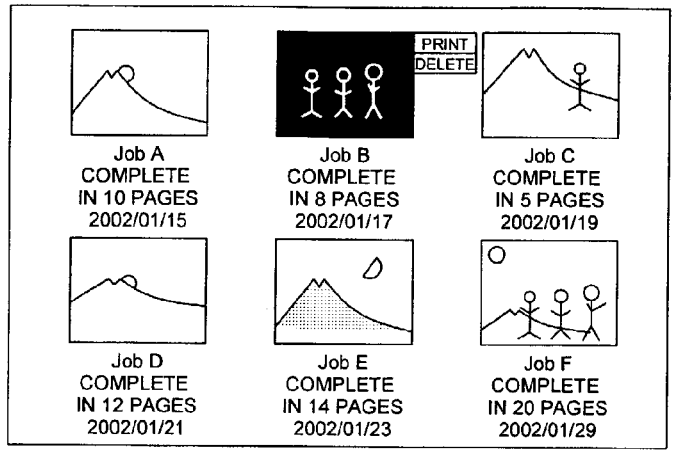
FIGS. 5(a) through 5(c) are illustrations of a display screen in an embodiment example of the invention.
Figure 5B:
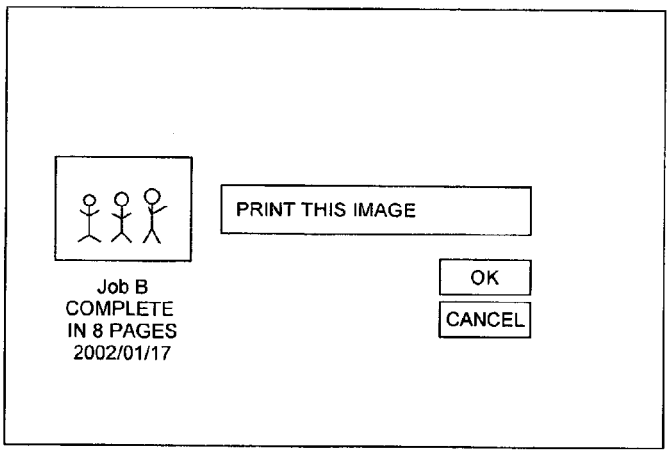
Figure 5C:
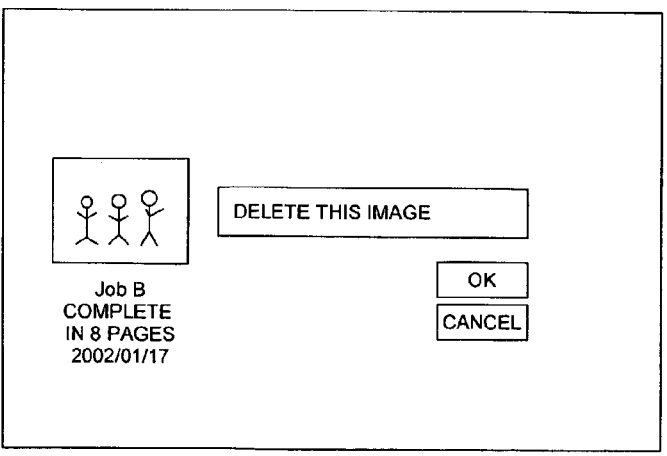

Further, when either one of thumbnail images displayed on a computer of registered user 20 is selected as shown in FIG. 4(*c*) (JobB of reversal display in FIG. 5(*a*)), and an instruction for printing is given by the registered user 20 (YES at S3 in FIG. 3, FIG. 5(*b*)), CPU 101 outputs an output image of the job that is the origin of the selected thumbnail image, by image-forming it from print engine 108 (FIG. 3 S4).

Figure 6:
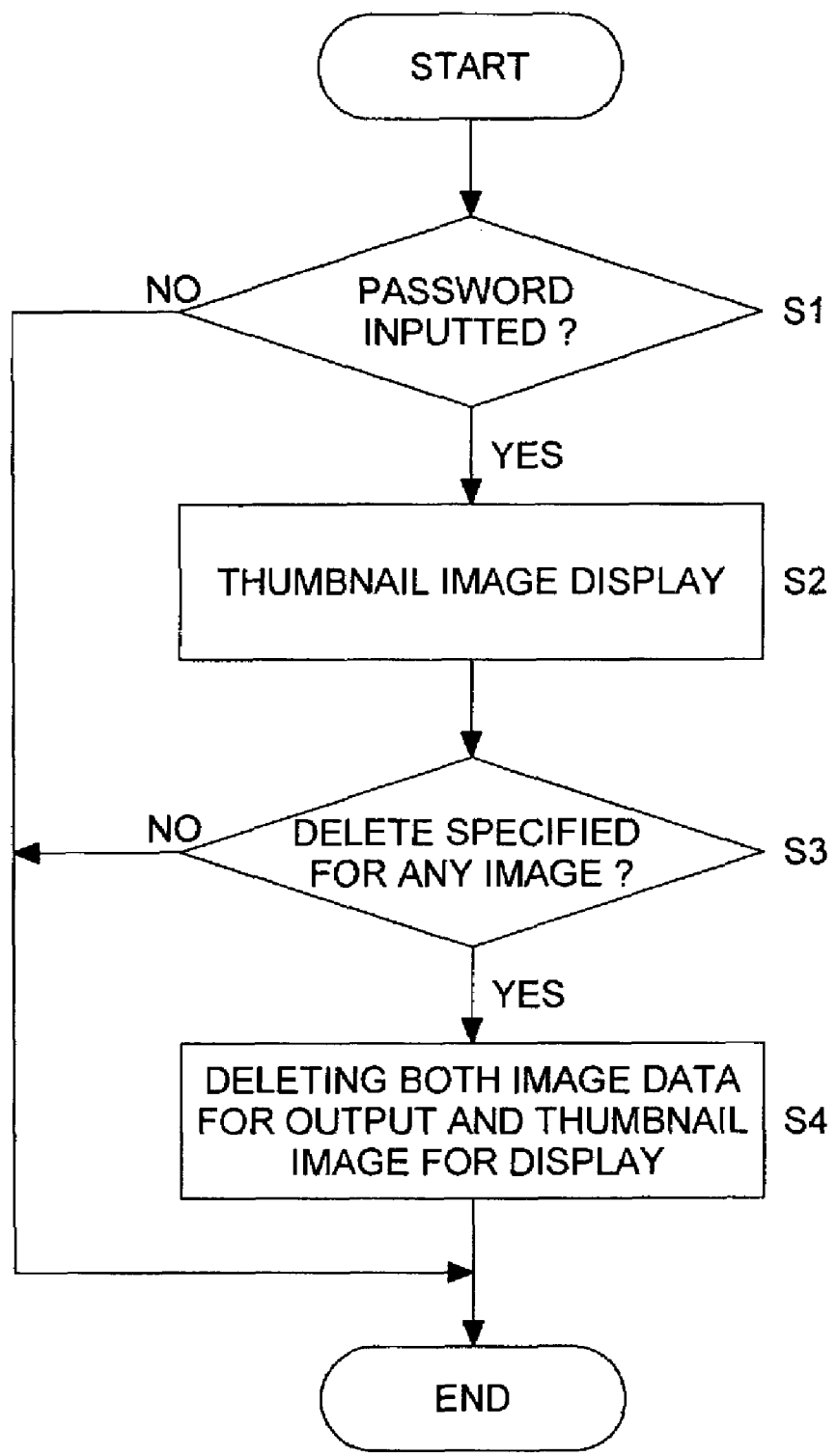
FIG. 6 is a flow chart showing operations of an image forming apparatus in the embodiment example representing an image forming apparatus of the invention.

In the same way, when either one of thumbnail images displayed on a computer of registered user 20 is selected as shown in FIG. 4(*c*) (JobB of reversal display in FIG. 5(*a*)), and an instruction for deleting is given by the registered user 20 (YES at S3 in FIG. 3, FIG. 5(*c*)), CPU 101 deletes both of the selected thumbnail image and image data of output use of the job that is the origin (FIG. 6 S4).

Incidentally, when deleting image data of output use for the job that is the origin, CPU 101 can delete the thumbnail image associated by the job name through interlocking.

Namely, in the present embodiment, output-use image data of each user and thumbnail images are managed to be in connection with each other, and thereby, when either one of them is deleted, the other can also be deleted through interlocking, and it is possible to manage image data efficiently while keeping consistency.

SECOND EMBODIMENT

Incidentally, in each embodiment stated above, image forming apparatus 100 representing a copying machine that can be connected with the network 1 was used in the concrete example. However, the image administration of the present embodiment can also be applied to various apparatuses other than the image forming apparatus 100.

Figures 12, 13:
FIG. 12 is an illustration of a display screen in the embodiment of the invention.
FIG. 13 is an illustration of a display screen in the embodiment of the invention.

Further, in each embodiment stated above, thumbnail images on the first page were explained by using them in the concrete example. However, thumbnail images on any page do not cause any problem, provided that they are the thumbnail images on at least one page. In this embodiment, on the contrary to the first embodiment, the job list, such as FIG. 12, is shown when a user is selected. By selecting a chosen one of job names listed, detailed data of the job, including a thumbnail image as shown in FIG. 13, is displayed.

Usually, image data takes some time to be transmitted through a network; therefore, it may be a long time as thumbnail images are displayed in such a list. In this embodiment, by omitting the list of thumbnail images, the list of job names can be displayed faster.

THIRD EMBODIMENT

In the third embodiment, CPU 101 has a function to store output-use image data and display-use thumbnail image in hard disk drive 106 and a function to generate display-use thumbnail image from the output-use image data and to store it, simultaneously with the work to store the output-use image data.

Further, CPU 101 has a function to store output-use image data and display-use thumbnail image in hard disk drive 106 and a function to read output-use image data from hard disk drive 106, to generate display-use thumbnail image and to store it in the hard disk drive 106.

In the present embodiment, as same as the previous embodiments, it is assumed that various types of initial data necessary for operations on web server 109 and on each section of other apparatuses and image data acquired through reading from scanner 104 are stored in hard disk drive 106.

Incidentally, though output-use image data and display-use thumbnail image are stored respectively in different directories in this case, it is possible either to store them in the same directory or to store them in different disk drives.

Operations of the characteristic portion of the present embodiment in the image forming apparatus as that stated above will be explained as follows, referring to flow charts in and after FIG. 2.

Figure 7:
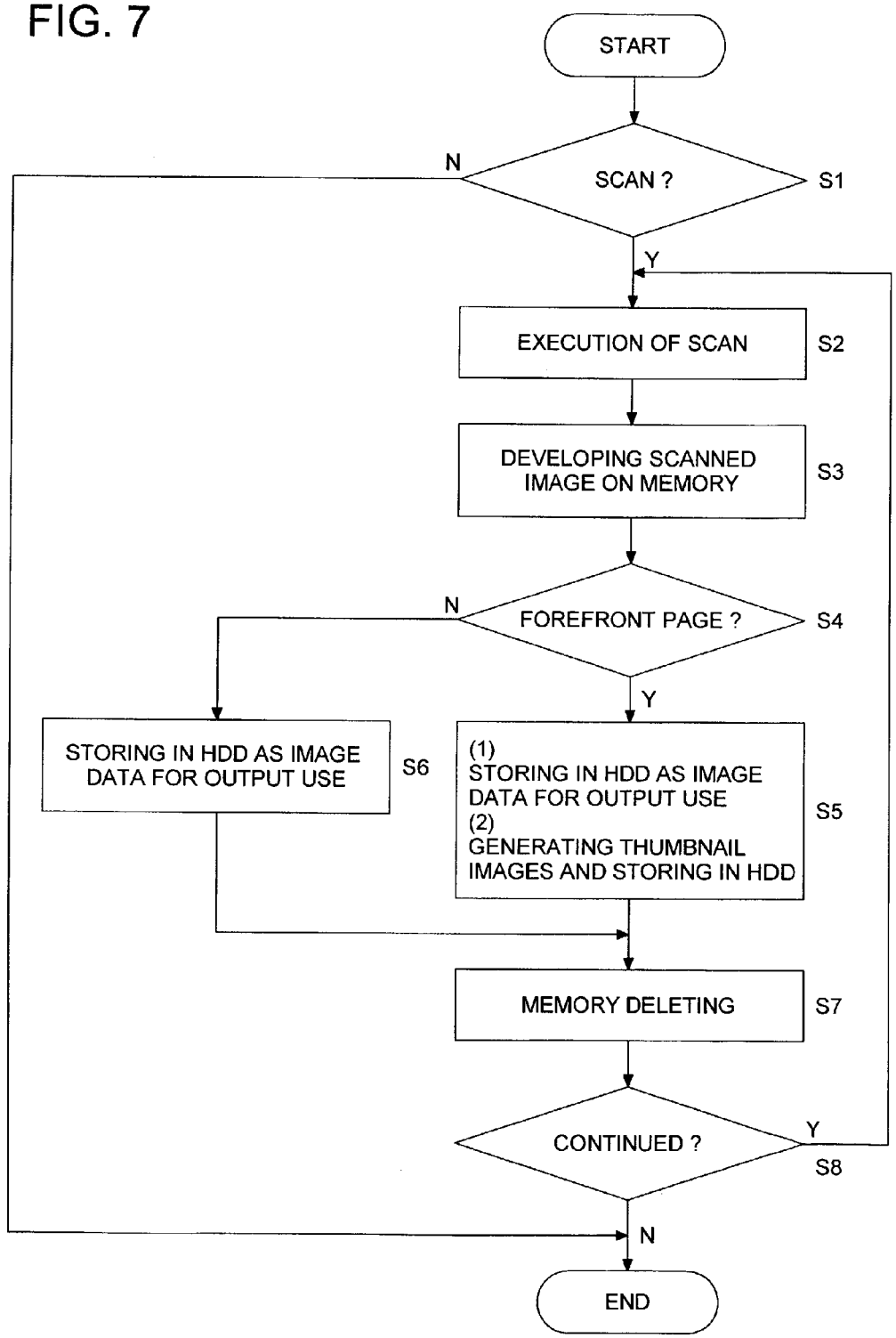
FIG. 7 is a flow chart showing operations of the image forming apparatus of the embodiment representing an image administration apparatus of the invention.

Incidentally, the flow chart in FIG. 7 shows how CPU 101 representing a control means operates based on the program stored in non-volatile memory 105, in the case of image administration relating to image data storage in execution of scanning of image forming apparatus 100.

Incidentally, in the explanation of operations in the following embodiment, controls and operations conducted by CPU 101 and by the program stored in non-volatile memory 105 are simply mentioned as control of CPU 101.

In the following control program, by using CGI (Common Gateway Interface) as a standard interface for utilizing an external program from web server 109, it is possible to conduct remaking of display-use thumbnail image, to conduct image forming from print engine 108 in accordance with instructions from a computer of a user and to display the results of image forming in print engine 108 on the computer of a user.

When the power supply for the image forming apparatus 100 is turned on, control program stored in non-volatile memory 105 is developed on memory 107 by IPL, and the control program on the memory 107 makes CPU 101 to conduct control of image administration.

First, in accordance with the control program, CPU 101 confirms whether or not scanning of document images by scanner 104 has been requested from operation display section 103 or from a user through network 1 (FIG. 7 S1).

If the scanning of document images by scanner 104 has been requested (YES in FIG. 7 S1), the scanning (reading) of document images is executed by the use of the scanner 104 (FIG. 7 S2).

Figure 8:
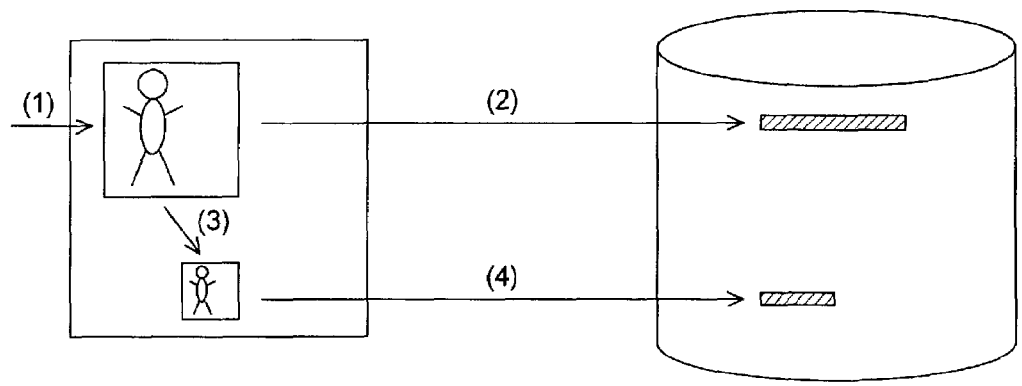
Figure 8:
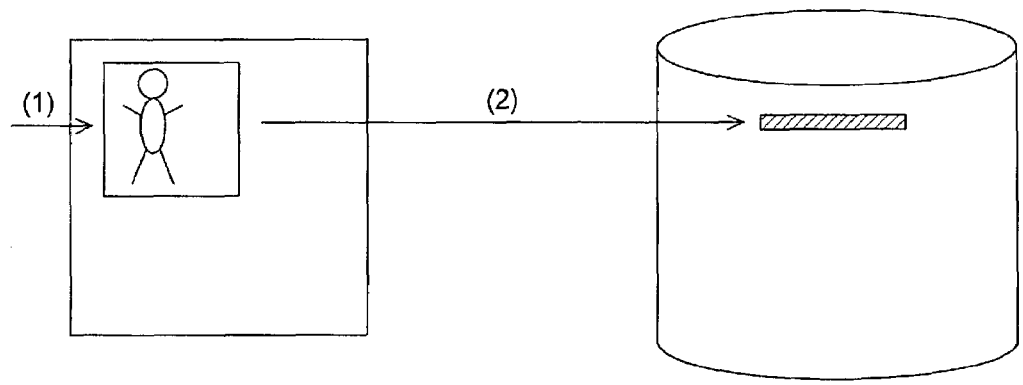
Figure 8:
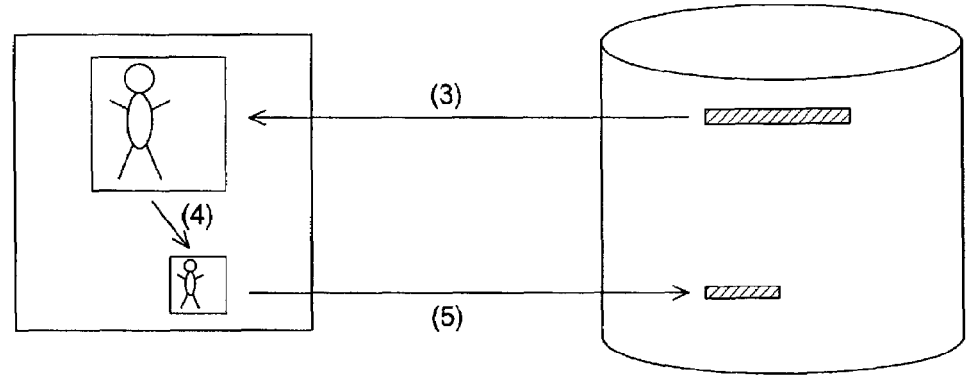

Then, the image obtained by the executed scanning is developed on memory 107 as image data (FIG. 7 S3). FIG. 8(*a*)(1) shows illustratively how these image data are developed.

If these image data on the memory correspond to the forefront page (first page) of the job that is subjected to scanning (YES in FIG. 7 S4), display-use thumbnail image is generated from image data representing the output-use image data (FIG. 8(*a*)(3)) to store it in hard disk drive 106 (FIG. 7 S5 (2), FIG. 8(*a*)(4)), simultaneously with the work (FIG. 7 S5 (1), FIG. 8(*a*)(2)) to store the image data in hard disk drive 106 as output-use image data Incidentally, "simultaneously" in this case means that a single CPU is made to work on a time-shared basis. However, it is also possible to arrange so that plural CPUs are made to work separately. Further, though the forefront page is mentioned in this case, optional plural pages specified may also be accepted.

Further, if these image data on the memory correspond to the page other than the forefront page (first page) of the job that is subjected to scanning (NO in FIG. 7 S4), the image data are stored in hard disk drive 106 as output-use image data (FIG. 7 S6).

When storing output-use image data and display-use thumbnail image in hard disk drive 106 in this case, they may be stored under the compressed state by the use of a known compression method, as occasion demands. In addition, when display-use thumbnail image is generated from output-use image data, a known method (for example, a thinning out method) may be used.

Then, after completion of the aforementioned operations, corresponding image data on the memory are deleted (FIG. 7 S7).

After that, it is checked whether scanning needs to be executed on the same job or not (FIG. 7 S8), and if the scanning is necessary on the same job, the flow returns back to S2 to execute scanning to repeat the same processing (FIG. 7 S2-). If the scanning is not necessary on the same job, the processing is terminated.

Owing to the simultaneous processing stated above (FIGS. 8(*a*)(2) and (*a*)(3) and (4)), it is possible to store plural image data, and to generate and store display-use thumbnail image efficiently as image data are stored, when making contents of the stored image data to be browsed by an external equipment as display-use thumbnail image.

Incidentally, in the operations mentioned above, there sometimes happen that CPU 101 and memory 107 conduct other operations (image forming) simultaneously. There also exist some occasions where resources of CPU 101 and memory 107 do not have any room, because of continuous scanning for a large number of images. In such a case, the display-use thumbnail image sometimes can fail to be generated (FIG. 7 S5 (2)) because operations other than those for generating thumbnail images have priority. In that case, display-use thumbnail image for that job are not stored in hard disk drive 106, and therefore, an indication like "NO IMAGE" in FIG. 9 to the effect that images prepared in advance do not exist may be put on the screen for the display of a list of images which are indicated (browsed) on the computer by web server 109.

FOURTH EMBODIMENT

The fourth embodiment of the present embodiment will be explained as follows. When the power supply for the image forming apparatus 100 is turned on, control program stored in non-volatile memory 105 is developed on memory 107 by IPL, and the control program on the memory 107 makes CPU 101 to conduct control of image administration.

Figure 10:
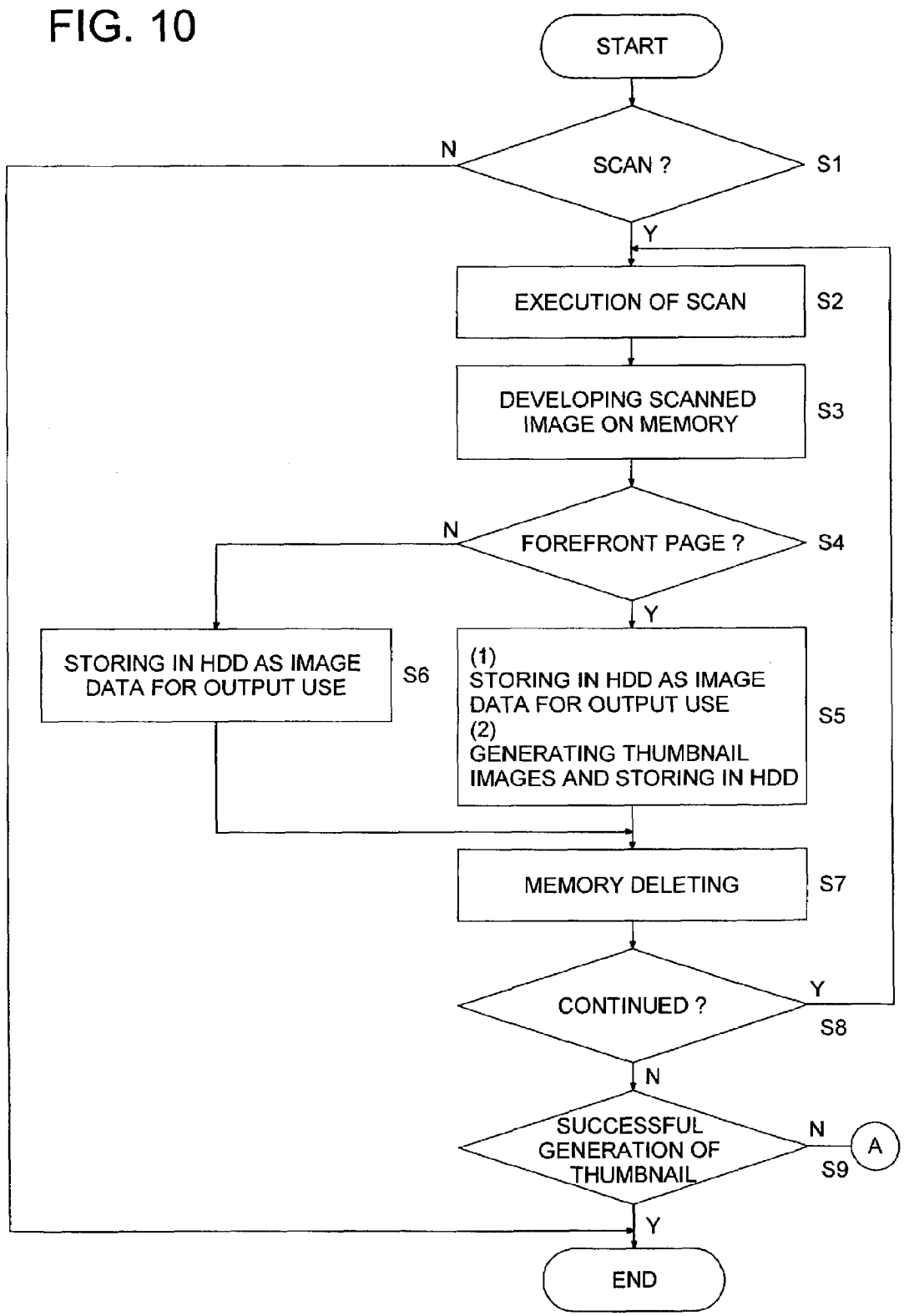
FIG. 10 is a flow chart showing operations of the image forming apparatus of the embodiment representing an image administration apparatus of the invention.

First, in accordance with the control program, CPU 101 confirms whether or not scanning of document images by scanner 104 has been requested from operation display section 103 or from a user through network 1 (FIG. 10 S1).

If the scanning of document images by scanner 104 has been requested (YES in FIG. 10 S1), the scanning (reading) of document images is executed by the use of the scanner 104 (FIG. 10 S2).

Then, the image obtained by the executed scanning is developed on memory 107 as image data (FIG. 10 S3). FIG. 8(*a*)(1) shows illustratively how these image data are developed.

If these image data on the memory correspond to the forefront page (first page) of the job that is subjected to scanning (YES in FIG. 10 S4), display-use thumbnail image is generated from image data representing the output-use image data (FIG. 8 (3)) to store it in hard disk drive 106 (FIG. 10 S5 (2), FIG. 8(*a*)(4)), simultaneously with the work (FIG. 10 S5 (1), FIG. 8(*a*)(2)) to store the image data in hard disk drive 106 as output-use image data.

Further, if these image data on the memory correspond to the page other than the forefront page (first page) of the job that is subjected to scanning (NO in FIG. 10 S4), the image data are stored in hard disk drive 106 as output-use image data (FIG. 10 S6)

When storing output-use image data and display-use thumbnail image in hard disk drive 106 in this case, they may be stored under the compressed state by the use of a known compression method, as occasion demands. In addition, when display-use thumbnail image is generated from output-use image data, a known method (for example, a thinning out method) may be used.

Then, after completion of the aforementioned operations, corresponding image data on the memory are deleted (FIG. 10 S7).

After that, it is checked whether scanning needs to be executed on the same job or not (FIG. 10 S8), and if the scanning is necessary on the same job, the flow returns back to S2 to execute scanning to repeat the same processing (FIG. 10 S2-).

Further, if scanning on the same job is not necessary, it is checked whether generation of the display-use thumbnail image was successful or not (FIG. 10 S9). If the generation of the display-use thumbnail image is successful (YES in FIG. 10 S9), a series of processing is terminated.

Figure 11:
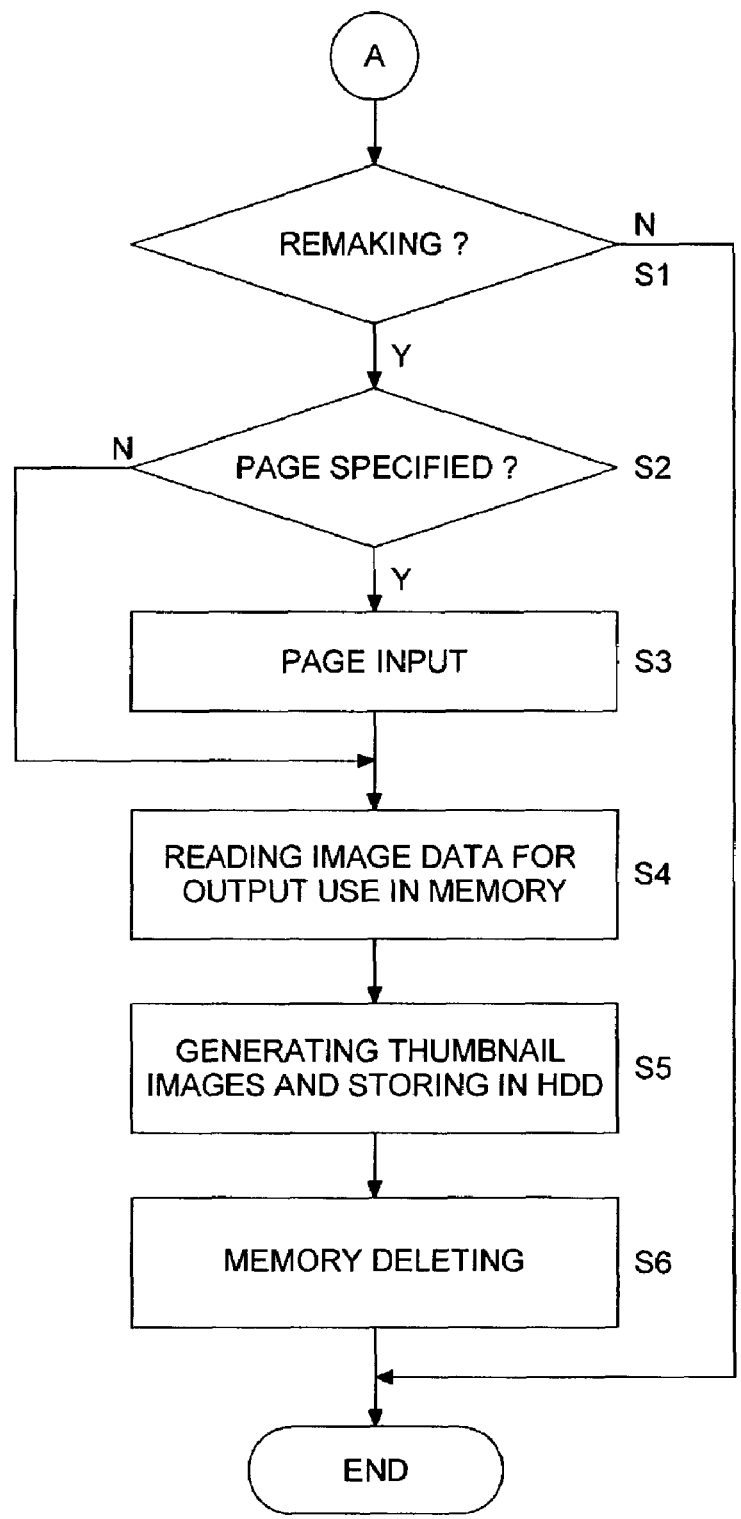
FIG. 11 is a flow chart showing operations of the image forming apparatus of the embodiment representing an image administration apparatus of the invention.

If the generation of the display-use thumbnail image is not successful (NO in FIG. 10 S9), the flow moves to the sub-routine in FIG. 11. Or, even in the case where the job having no display-use thumbnail image is selected in the display of a list of images (FIG. 9) indicated on the computer of a user, after a series of processing in FIG. 7 is terminated, the sub-routine in FIG. 11 is executed.

First, CPU 101 checks whether remaking is necessary or not for the display-use thumbnail image which were not made (FIG. 11 S1). If the processing is a continuation from those in FIG. 10, there is executed remaking (YES in FIG. 11 S1). Further, the remaking is conducted even when remaking is checked in the screen of FIG. 9(*b*) indicated on the computer of a user, when processing in FIG. 7 fails (YES in FIG. 11 S1). This state corresponds to the state of FIG. 8(*b*1)(1) and (2), because display-use thumbnail image is not generated.

Figure 9:
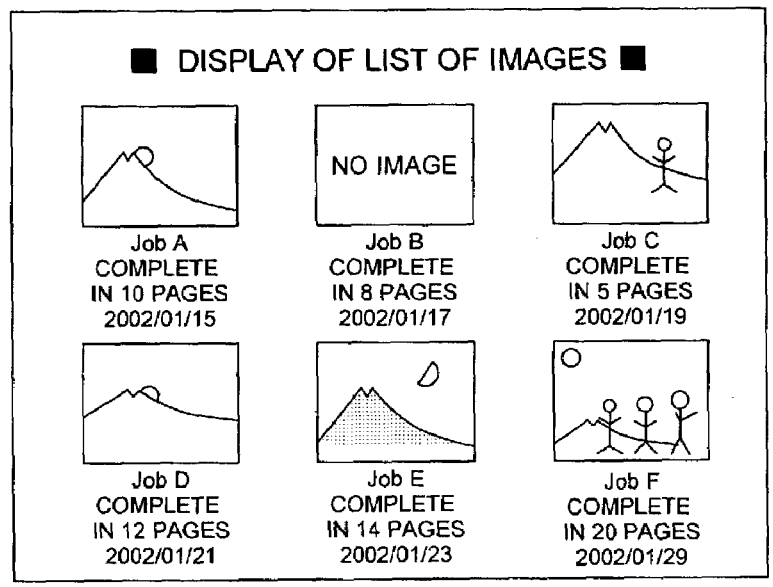
FIGS. 9(a) and 9(b) are illustrations of a display screen in the embodiment of the invention.
Figure 9:
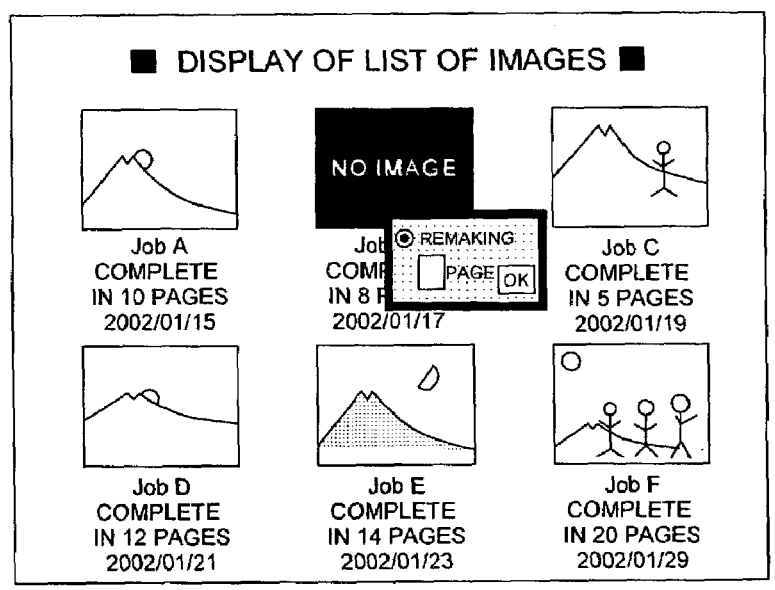

In this connection, though display-use thumbnail image is generated usually for the forefront page of a job, when the job is specified by the user as shown on the screen in FIG. 9(*b*), the job is accepted so that display-use thumbnail image may be generated for the optional page (YES in FIG. 11 S2, S3). If there is no specification in particular, the forefront page of the initial value can be used.

Then, output-use image data on the corresponding page (specified page if designated, or the first page if there is no designation) of the job are read from hard disk drive 106 to be developed on memory 107 as image data (FIG. 11 S4). This state corresponds to the state of FIG. 8(*b*2)(3). In this connection, if the image data are stored in hard disk drive 106 under the state of compression, they may also be developed on memory 107 while they are extended.

At this point of time, display-use thumbnail image is generated from the image data developed on memory 107 (FIG. 8(*b*2)(4)) and are stored in hard disk drive 106 (FIG. 11 S5, FIG. 8(*b*2)(5)).

When storing thumbnail images in hard disk drive 106 at this point of time, they may be stored under the state of compression by the known compression method as occasion demands. In addition, when display-use thumbnail image is generated from output-use image data, a known method (for example, a thinning out method) may be used.

Then, after completion of the aforementioned operations, corresponding image data on the memory are deleted (FIG. 7 S6).

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively.

Namely, owing to the processing in time sequence as shown in FIG. 11 (FIG. 8(*b*1)(2) and FIG. 8(*b*2)(4) and (5)), material resources such as CPU and a memory can be utilized effectively and a plurality of image data are stored, and when contents of the stored image data are browsed by an external equipment as display-use thumbnail image, display-use thumbnail image can be generated and stored efficiently as image data are stored.

Namely, even when material resources such as CPU 101 and memory 107 are used for other processing, it is possible to generate display-use thumbnail image surely without affecting other processing adversely.

By arranging so that a page for generating display-use thumbnail image may be accepted from the computer of a user, optional display-use thumbnail image can be generated and stored.

Incidentally, when a mistake is made again for remaking of display-use thumbnail image because material resources such as CPU and a hardware are used for other jobs, despite the instruction for remaking of display-use thumbnail image made by a user on the screen on FIG. 9(*b*), "NO IMAGE" remains as shown in FIG. 9(*a*). Therefore, remaking can be instructed further from the computer of the user.

FIFTH EMBODIMENT

In the fourth embodiment, work to generate and store display-use thumbnail image is conducted simultaneously with work to store output-use image data, and when the display-use thumbnail image fail to be generated, the display-use thumbnail image have been generated later.

Contrary to this, in this fifth embodiment, the simultaneous processing is not conducted from the beginning, instead, the work to store output-use image data is conducted, and after completion of this work, work to generate display-use thumbnail image and to store it is conducted.

Owing to the processing in time sequence like this, material resources such as CPU and a memory can be utilized effectively and a plurality of image data are stored, and when contents of the stored image data are browsed by an external equipment as display-use thumbnail image, display-use thumbnail image can be generated and stored efficiently as image data are stored.

OTHER EMBODIMENTS

Though image forming apparatus 100 representing a copying machine that can be connected to network 1 was used an a concrete example in each embodiment stated above, the image administration of the present embodiment can be applied also to each apparatus other than the aforesaid apparatus.

As explained in detail above in the embodiment, the following effects are exhibited by the invention.

(1) In the image administration method, when image data are stored and when contents of the image data are browsed from the outside, the image data are managed by a directory using a user name and a job name, input of a user name controls each job of the corresponding user to be capable of being accessed, and thumbnail images on at least one page of image data of each job are generated under the file name relating to the job name so that the thumbnail images may be controlled to be browsed from the outside.

Therefore, without input of the user name, neither access to each image data nor browsing of thumbnail images is possible, thus, there is caused no problem that contents of image data are disclosed to others and security is lowered. It is further possible to manage image data of each user and thumbnail images to be in connection with each other, and to manage image data efficiently.

Namely, image data can be managed and can be browsed efficiently while security of each user is taken into consideration, even when a plurality of image data are being stored in each of plural users.

(2) In the image administration method, when image data are stored and when contents of the image data are browsed from the outside, the image data are managed by a directory using a user name and a job name, input of a user name controls each job of the corresponding user to be capable of being accessed, and thumbnail images on at least one page of image data of each job are generated under the file name relating to the job name so that the thumbnail images may be controlled to be browsed from the outside.

Therefore, without input of the user name, neither access to each image data nor browsing of thumbnail images is possible, thus, there is caused no problem that contents of image data are disclosed to others and security is lowered. It is further possible to manage image data of each user and thumbnail images to be in connection with each other, and to manage image data efficiently.

Namely, image data can be managed and can be browsed efficiently while security of each user is taken into consideration, even when a plurality of image data are being stored in each of plural users.

(3) In the image administration method, when image data are stored and when contents of the image data are browsed from the outside, the image data are managed by a directory using a user name and a job name, input of a user name controls each job of the corresponding user to be capable of being accessed, and thumbnail images on at least one page of image data of each job are generated under the file name relating to the job name so that the thumbnail images may be controlled to be browsed from the outside.

Therefore, without input of the user name, neither access to each image data nor browsing of thumbnail images is possible, thus, there is caused no problem that contents of image data are disclosed to others and security is lowered. It is further possible to manage image data of each user and thumbnail images to be in connection with each other, and to manage image data efficiently.

Namely, image data can be managed and can be browsed efficiently while security of each user is taken into consideration, even when a plurality of image data are being stored in each of plural users.

(4) In the aforementioned (1)-(3), image data of each user and thumbnail images are managed to be in connection with each other, and thereby, when either one of them is deleted, the other can also be deleted through interlocking, and it is possible to manage image data efficiently while keeping consistency.

(5) In the aforementioned (1)-(3), image data of each user and thumbnail images are managed to be in connection with each other, and thereby, when display thumbnail images, it is possible to display also the number of sheets of images together, by acquiring information of a job to which original image data belong, and it is possible to manage image data efficiently.

(6) In the aforementioned (5), it is possible to manage image data efficiently by making information to be displayed to be either one of the number of sheets of images, a date, and a condition of output, or a combination thereof.

(7) In the image administration method, output-use image data are stored and display-use thumbnail image is generated from the output-use image data and are stored in the storage means simultaneously with the work to store output-use image data in the storage means, when making contents of output-use image data to be browsed from the outside as display-use thumbnail image.

Owing to the simultaneous processing like this, it is possible to generate and store display-use thumbnail image efficiently as image data are stored, when storing plural image data and making contents of the stored image data to be browsed by an external equipment as display-use thumbnail image.

(8) In the image administration method, output-use image data are read from the storage means on an inner memory area and display-use thumbnail image is generated from the output-use image data to be stored in the storage means, after completion of the work to store output-use image data in the storage means, when storing output-use image data and making contents of output-use image data to be browsed from the outside as display-use thumbnail image.

Owing to the processing in time sequence like this, material resources such as CPU and a memory can be utilized effectively, and display-use thumbnail image can be generated and stored efficiently as image data are stored, when storing plural image data and making contents of the stored image data to be browsed by an external equipment as display-use thumbnail image.

(9) In the image administration method, display-use thumbnail image is generated from the output-use image data to be stored in the storage means, simultaneously with the work to store output-use image data in the storage means, when storing output-use image data and making contents of the output-use image data to be browsed from the outside as display-use thumbnail image, and when the display-use thumbnail image fail to be generated, the output-use image data are read out of the storage means on an inner memory area and display-use thumbnail image is generated from the output-use image data to be stored in the storage means, after completion of the work to store the output-use image data in the storage means.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

(10) In the image administration method, after completion of the work to accept instructions for generating display-use thumbnail image and to store the output-use image data in the storage means in the aforesaid (8) or (9), a specific page of the aforementioned output-use image data is read on an inner memory area from the storage means, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

(11) In the image administration method, after completion of the work to accept instructions for the page for which the display-use thumbnail image is generated and to store the output-use image data in the storage means in the aforesaid (8) or (9), the specified page of the aforementioned output-use image data is read from the storage means, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

(12) In the image administration apparatus, output-use image data are stored, and display-use thumbnail image is generated from the output-use image data to be stored in the storage means simultaneously with the work to store output-use image data in the storage means when making contents of output-use image data to be browsed by the outside as display-use thumbnail image.

Owing to the simultaneous processing like this, it is possible to generate and store display-use thumbnail image efficiently as image data are stored, when storing plural image data and making contents of the stored image data to be browsed by an external equipment as display-use thumbnail image.

(13) In the image administration apparatus, the output-use image data are read from the storage means on an inner memory area and display-use thumbnail image is generated from the output-use image data to be stored in the storage means after completion of the work to store output-use image data in the storage means, after completion of the work to store output-use image data in the storage means, when storing output-use image data and making contents of output-use image data to be browsed by the outside as display-use thumbnail image.

Owing to the processing in time sequence like this, material resources such as CPU and a memory can be utilized effectively and display-use thumbnail image can be generated and stored efficiently as image data are stored, when storing plural image data and making contents of the stored image data to be browsed by an external equipment as display-use thumbnail image.

(14) In the image administration apparatus, display-use thumbnail image is generated from the output-use image data to be stored in the storage means, simultaneously with the work to store output-use image data in the storage means, when storing output-use image data and making contents of the output-use image data to be browsed from the outside as display-use thumbnail image, simultaneously with the work to store output-use image data in the storage means, and when the display-use thumbnail image fail to be generated, the output-use image data are read out of the storage means on an inner memory area and display-use thumbnail image is generated from the output-use image data to be stored in the storage means, after completion of the work to store the output-use image data in the storage means.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

(15) In the image administration apparatus, after completion of the work to accept instructions for generating display-use thumbnail image and to store the output-use image data in the storage means in the aforesaid (13) or (14), the specific page of the aforementioned output-use image data is read from the storage means on an inner memory area, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

(16) In the image administration apparatus, after completion of the work to accept instructions of the page for generating display-use thumbnail image and to store the output-use image data in the storage means in the aforesaid (13) or (14), the specified page of the aforementioned output-use image data is read from the storage means, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

(17) In the image administration program, display-use thumbnail image is generated and stored in the storage means simultaneously with the work to store output-use image data in the storage means, when storing output-use image data and making contents of output-use image data to be browsed from the outside as display-use thumbnail image.

Owing to the simultaneous processing like this, it is possible to generate and store display-use thumbnail image efficiently as image data are stored, when storing plural image data and making contents of the stored image data to be browsed by an external equipment as display-use thumbnail image.

(18) In the image administration apparatus, the output-use image data are read from the storage means on an inner memory area and display-use thumbnail image is generated from the output-use image data to be stored in the storage means after completion of the work to store output-use image data in the storage means when storing output-use image data and making contents of output-use image data to be browsed by the outside as display-use thumbnail image.

Owing to the processing in time sequence like this, material resources such as CPU and a memory can be utilized effectively, and display-use thumbnail image can be generated and stored efficiently as image data are stored, when storing plural image data and making contents of the stored image data to be browsed by an external equipment as display-use thumbnail image.

(19) In the image administration program, display-use thumbnail image is generated from the output-use image data to be stored in the storage means, simultaneously with the work to store output-use image data in the storage means, when storing output-use image data and making contents of the output-use image data to be browsed from the outside as display-use thumbnail image, and when the display-use thumbnail image fail to be generated, the output-use image data are read out of the storage means on an inner memory area and display-use thumbnail image is generated from the output-use image data to be stored in the storage means, after completion of the work to store the output-use image data in the storage means.

As stated above, simultaneous processing is executed first, and when failing in the simultaneous processing, processing in time sequence is conducted, and thereby, when there is room for material resources such as CPU and a memory, simultaneous processing is conducted, while, when there is no room for material resources such as CPU and a memory, processing in time sequence is conducted, and thereby, processing time and resources can be utilized effectively, and it is possible to generate and store display-use thumbnail image efficiently as image data are stored, when storing a plurality of image data and making contents of the stored image data to be browsed by an external equipment as display-use thumbnail image.

(20) In the image administration apparatus, after completion of the work to accept instructions for generating display-use thumbnail image and to store the output-use image data in the storage means in the aforesaid (18) or (19), the specific page of the aforementioned output-use image data is read from the storage means on an inner memory area, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

(21) In the image administration apparatus, after completion of the work to accept instructions of the page for generating display-use thumbnail image and to store the output-use image data in the storage means in the aforesaid (18) or (19), the specified page of the aforementioned output-use image data is read from the storage means, and display-use thumbnail image is generated from the output-use image data to be stored in the storage means.

Owing to the processing like this, it is possible to generate and store optional display-use thumbnail image when making contents of the stored image data to be browsed by an external equipment as display-use thumbnail image.

What is claimed is:

1. An image administration method, comprising the steps of:
   storing output-use image data; and
   making contents of said output-use image data to be browsed from outside of an image administration apparatus as display-use thumbnail image;
   wherein said display-use thumbnail image is generated from said output-use image data to be stored in a storage means simultaneously with storing said output-use image data in said storage means; and
   when said display-use thumbnail image fail to be generated, said output-use image data are read from said storage means, said display-use thumbnail image is regenerated from said output-use image data and said display-use thumbnail image is stored in said storage means, after completion of storing said output-use image data in said storage means.

2. The image administration method of claim 1, comprising the step of:
   accepting instructions for generating said display-use thumbnail image of said output-use image data;
   wherein a specific page of said output-use image data is read from said storage means, display-use thumbnail image is generated from said output-use image data and said display-use thumbnail image is stored in said storage means, after completion of storing said output-use image data in said storage means.

3. The image administration method of claim 1, comprising the step of:
   accepting instructions for specifying a page for generating said display-use thumbnail image of said output-use image data when said output-use image data are composed of plural pages;
   wherein a specified page of said output-use image data is read from said storage means, display-use thumbnail image is generated from said output-use image data and said display-use thumbnail image is stored in said storage means, after completion of storing said output-use image data in said storage means.

4. The image administration method of claim 1, comprising the step of:
   accepting instructions for generating said display-use thumbnail image of said output-use image data;
   wherein a specific page of said output-use image data is read from said storage means, display-use thumbnail image is generated from said output-use image data and said display-use thumbnail image is stored in said storage means, after completion of storing said output-use image data in said storage means.

5. The image administration method of claim 1, comprising the step of:
   accepting instructions for specifying a page for generating said display-use thumbnail image of said output-use image data when said output-use image data are composed of plural pages;
   wherein a specified page of said output-use image data is read from said storage means, display-use thumbnail image is generated from said output-use image data and said display-use thumbnail image is stored in said storage means, after completion of storing said output-use image data in said storage means.

6. An image administration apparatus, comprising:
   a storage means for storing output-use image data and a display-use thumbnail image; and
   a control means for generating said display-use thumbnail image from said output-use image data and for storing said display-use thumbnail image in said storage means simultaneously with storing said output-use image data in said storage means;
   wherein when failing in generation of said display-use thumbnail image, said control means reads out said output-use image data from said storage means, generates said display-use thumbnail image from said output-use image data and stores said display-use thumbnail in said storage means, after completion of storing said output-use image data in said storage means.

7. The image administration apparatus of claim 6, comprising:
   an operation input means for accepting instructions for generating said display-use thumbnail image of said output-use image data; and
   said control means for controlling said image administration apparatus so that a specific page of said output-use image data is read from said storage means, display-use thumbnail image is generated from said output-use image data and said display-use thumbnail image is stored in said storage means, after completion of storing said output use image data in said storage means.

8. The image administration apparatus of claim 6, comprising:
   an operation input means for accepting instructions for specifying a page for generating said display-use thumbnail image of said output-use image data when said output-use image data are composed of plural pages;
   said control means for controlling said image administration apparatus so that a specified page of said output-use image data is read from said storage means, display-use thumbnail image is generated from said output-use image data and said display-use thumbnail image is stored in said storage means, after completion of storing said output-use image data in said storage means.

9. The image administration apparatus of claim 6, comprising:
   an operation input means for accepting instructions for generating said display-use thumbnail image of said output-use image data; and
   said control means for controlling said image administration apparatus so that a specific page of said output-use image data is read from said storage means, display-use thumbnail image is generated from said output-use image data and said display-use thumbnail image is stored in said storage means, after completion of storing said output use image data in said storage means.

10. The image administration apparatus of claim 6, comprising:
    an operation input means for accepting instructions for specifying a page for generating said display-use thumbnail image of said output-use image data when said output-use image data are composed of plural pages;
    said control means for controlling said image administration apparatus so that a specified page of said output-use image data is read from said storage means, display-use thumbnail image is generated from said output-use image data and said display-use thumbnail image is stored in said storage means, after completion of storing said output-use image data in said storage means.

11. An image administration program, used with an image administration apparatus, comprising the steps of:

storing output-use image data; and making contents of said output-use image data to be browsed from outside of an image administration apparatus as display-use thumbnail image;

wherein said display-use thumbnail image is generated from said output-use image data to be stored in a storage means simultaneously with storing said output-use image data in said storage means; and when said display-use thumbnail image fail to be generated, said output-use image data are read from said storage means, said display-use thumbnail image is regenerated from said output-use image data and said display-use thumbnail image is stored in said storage means, after completion of storing said output-use image data in said storage means.

12. The image administration program of claim 11, comprising the step of:

accepting instructions for generating said display-use thumbnail image of said output-use image data;

wherein a specific page of said output-use image data is read from said storage means, display-use thumbnail image is generated from said output-use image data and said display-use thumbnail image is stored in said storage means, after completion of storing said output-use image data in said storage means.

13. The image administration program of claim 11, comprising the step of:

accepting instructions for specifying a page for generating said display-use thumbnail image of said output-use image data when said output-use image data are composed of plural pages;

wherein a specific page of said output-use image data is read from said storage means, display-use thumbnail image is generated from said output-use image data and said display-use thumbnail image is stored in said storage means, after completion of storing said output-use image data in said storage means.

14. The image administration program of claim 11, comprising the step of:

accepting instructions for generating said display-use thumbnail image of said output-use image data;

wherein a specific page of said output-use image data is read from said storage means, display-use thumbnail image is generated from said output-use image data and said display-use thumbnail image is stored in said storage means, after completion of storing said output-use image data in said storage means.

15. The image administration program of claim 11, comprising the step of:

accepting instructions for specifying a page for generating said display-use thumbnail image of said output-use image data when said output-use image data are composed of plural pages;

wherein a specific page of said output-use image data is read from said storage means, display-use thumbnail image is generated from said output-use image data and said display-use thumbnail image is stored in said storage means, after completion of storing said output-use image data in said storage means.

* * * * *